(12) United States Patent
Canterbury

(10) Patent No.: US 7,367,889 B2
(45) Date of Patent: May 6, 2008

(54) GAMING MACHINE HAVING HARDWARE-ACCELERATED SOFTWARE AUTHENTICATION

(75) Inventor: Stephen A. Canterbury, Antioch, IL (US)

(73) Assignee: WMS Gaming Inc., Waukegan, IL (US)

( * ) Notice: Subject to any disclaimer, the term of this patent is extended or adjusted under 35 U.S.C. 154(b) by 784 days.

(21) Appl. No.: 10/457,280

(22) Filed: Jun. 9, 2003

(65) Prior Publication Data

US 2004/0248646 A1    Dec. 9, 2004

(51) Int. Cl.
    *A63F 13/00*    (2006.01)
(52) U.S. Cl. ........................................ 463/43
(58) Field of Classification Search ............... 463/16, 463/29, 40, 43
    See application file for complete search history.

(56) References Cited

U.S. PATENT DOCUMENTS

| | | | |
|---|---|---|---|
| 4,405,829 A | 9/1983 | Rivest et al. | 178/22.1 |
| 4,727,544 A | 2/1988 | Brunner et al. | 371/21 |
| 5,231,668 A | 7/1993 | Kravitz | 380/28 |
| 5,643,086 A | 7/1997 | Alcorn et al. | 463/29 |
| 5,644,704 A | 7/1997 | Pease et al. | 395/183.18 |
| 6,071,190 A | 6/2000 | Weiss et al. | 463/25 |
| 6,099,408 A | 8/2000 | Schneier et al. | 463/29 |
| 6,106,396 A | 8/2000 | Alcorn et al. | 463/29 |
| 6,149,522 A | 11/2000 | Alcorn et al. | 463/29 |
| 6,203,427 B1 | 3/2001 | Walker et al. | 463/16 |
| 6,264,557 B1 | 7/2001 | Schneier et al. | 463/29 |
| 6,450,885 B2 | 9/2002 | Schneier et al. | 463/29 |
| 6,527,638 B1 | 3/2003 | Walker et al. | 463/25 |
| 6,565,443 B1 | 5/2003 | Johnson et al. | 463/43 |
| 6,595,856 B1 | 7/2003 | Ginsburg et al. | 463/29 |
| 6,620,047 B1 | 9/2003 | Alcorn et al. | 463/37 |
| 6,685,567 B2 | 2/2004 | Cockerille et al. | 463/43 |
| 6,722,986 B1 | 4/2004 | Lyons et al. | 463/29 |
| 2003/0130032 A1* | 7/2003 | Martinek et al. | 463/29 |
| 2003/0196108 A1* | 10/2003 | McCarroll | 713/194 |
| 2004/0002381 A1 | 1/2004 | Alcorn et al. | 463/37 |
| 2004/0038740 A1 | 2/2004 | Muir | 463/40 |

FOREIGN PATENT DOCUMENTS

| | | |
|---|---|---|
| GB | 2121569 A | 12/1983 |
| JP | 8-141196 | 6/1996 |
| JP | 10-192533 | 7/1998 |
| WO | WO 97/08870 A2 | 3/1997 |

(Continued)

OTHER PUBLICATIONS

Digital Signature Standard (DDS), FIPS PUB 186-2, U.S. Department of Commerce/National Institute of Standards and Technology, 72 pages (Jan. 27, 2000).

(Continued)

*Primary Examiner*—Kim Nguyen
(74) *Attorney, Agent, or Firm*—Nixon Peabody LLP

(57) ABSTRACT

A system and method for accelerating authentication of software in a gaming machine. The machine includes at least one storage media for storing software that controls a function of the machine, a processor for executing the software, and validation circuitry for at least partially authenticating the software. The validation circuitry is coupled to both the processor and the storage media.

35 Claims, 3 Drawing Sheets

FOREIGN PATENT DOCUMENTS

| | | |
|---|---|---|
| WO | WO 97/08870 A3 | 3/1997 |
| WO | WO99/65579 | 12/1999 |
| WO | WO 99/66413 A1 | 12/1999 |
| WO | WO00/33196 | 6/2000 |
| WO | WO 01/24012 A1 | 4/2001 |
| WO | WO01/67218 A1 | 9/2001 |
| WO | WO 02/15998 A2 | 2/2002 |
| WO | WO 02/15998 A3 | 2/2002 |
| WO | WO 02/101537 A1 | 12/2002 |
| WO | WO 03/045519 A1 | 6/2003 |

OTHER PUBLICATIONS

Schneier B: "Applied Cryptography Protocols, Algorithms, and Source Code in C"; Jan. 1, 1996, John Wiley & Sons, New York, US, XP002298839 ISBN: 0-471-12845-7—p. 431.

"JFFS—Journaling Flash File System" Jan. 15, 2003, XP002298844; URL:http://web.archive.org/web/20030115142058/http://developer.axis.com/software/jffs/doc/jffs.html—retrieved on Oct. 1, 2004—p. 1-p. 6.

\* cited by examiner

GAMING MACHINE HAVING HARDWARE-ACCELERATED SOFTWARE AUTHENTICATION

REFERENCE TO RELATED APPLICATIONS

This application is related to U.S. patent application Ser. No. 10/119,663 filed Apr. 10, 2002, entitled "Gaming Software Authentication," and incorporated herein by reference in its entirety.

FIELD OF THE INVENTION

The present invention relates generally to gaming machines, and more particularly, to software authentication in a gaming machine.

BACKGROUND OF THE INVENTION

As a regulatory requirement in virtually all jurisdictions that allow gaming, it is necessary to have a technique to authenticate that the software installed in a gaming machine is tested and approved. In the past, gaming manufacturers have generally used EPROM-based hardware platforms to store program code. As a result, a number of software authentication techniques have been accepted as standards throughout the gaming industry. Depending upon the preferences of the local regulatory agency, these techniques generally include either a Kobetron signature or a hash function based on the data stored in the EPROM device.

Authentication of software programs basically occurs using two different methods in the field, again determined by the local regulatory agency. In one method, each EPROM is authenticated by a gaming agent prior to being installed in a gaming machine that is to be brought up for play. The EPROMs may be shipped directly to the gaming agency for authentication prior to the install date of the machine, or may be authenticated on the casino floor as the software is being installed in the machine. In another method, authentication is conducted on a spot-check basis. A gaming agent periodically visits a casino and picks machines selectively or at random to remove the software components for authentication.

Jurisdictional requirements require that storage media containing code or data to be authenticated at power-up, continuously or at a periodic rate, or upon occurrence of events such as the opening of the main door of the gaming device. Such storage media may consist of erasable programmable read-only memory devices (EPROMs), CompactFlash storage cards, hard disc drives, CD drives, etc. Authentication of a storage media is performed by the gaming device's central processing unit (CPU). Typically, one or more hash values for all or part of the data located on the media has been generated. This hash value is usually generated using authentication algorithms such as SHA-1 or MD5. The hash is then encrypted using an algorithm such as the digital signature algorithm (DSA) to form a signature that is usually stored on the media. Additionally, to provide even more security, some or all of the data on the media may be encrypted either prior to the generation of the signature or after the generation of the signature using methods such as private key bulk encryption which includes algorithms such as the data encryption standard (DES), Triple-DES (3DES), or the advanced encryption standard (AES). In order to authenticate the data stored on the media, the CPU must decrypt any encrypted data and must regenerate the hash values and compare them to the stored values. Authentication by the CPU may take several minutes due to increasing complexity of the gaming device's software and thus the storage size of the media. Thus, some system and/or method for speeding up the authentication process would be greatly beneficial.

SUMMARY OF THE INVENTION

The present invention overcomes the foregoing and other problems with a system and method for accelerating authentication of software in a gaming machine. The machine includes at least one storage media for storing software that controls a function of the machine, a processor for executing the software, and validation circuitry for at least partially authenticating the software. The validation circuitry is coupled to both the processor and the storage media.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
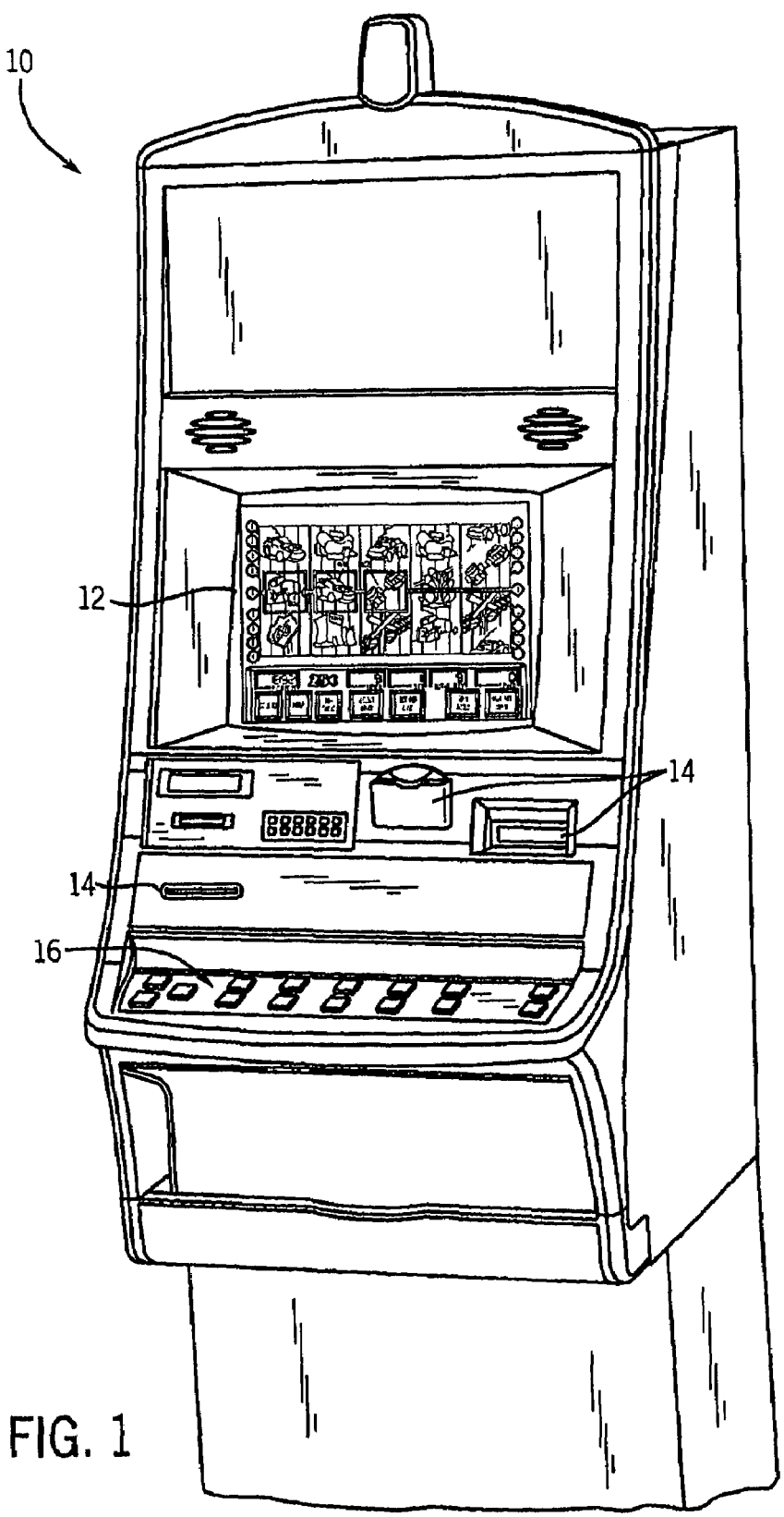
FIG. 1 is an isometric view of a gaming machine operable to conduct a wagering game.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

Turning now to the drawings and referring initially to FIG. 1, a gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slanttop" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

The gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table(s), and a "call attendant" button for calling an attendant. Additional game-specific buttons may be provided to facilitate play of the specific game executed on the machine. The touch screen may define touch keys for implementing many of the same functions as the push-buttons. Other possible user interface devices include a keyboard and a pointing device such as a mouse or trackball.

Figure 2:
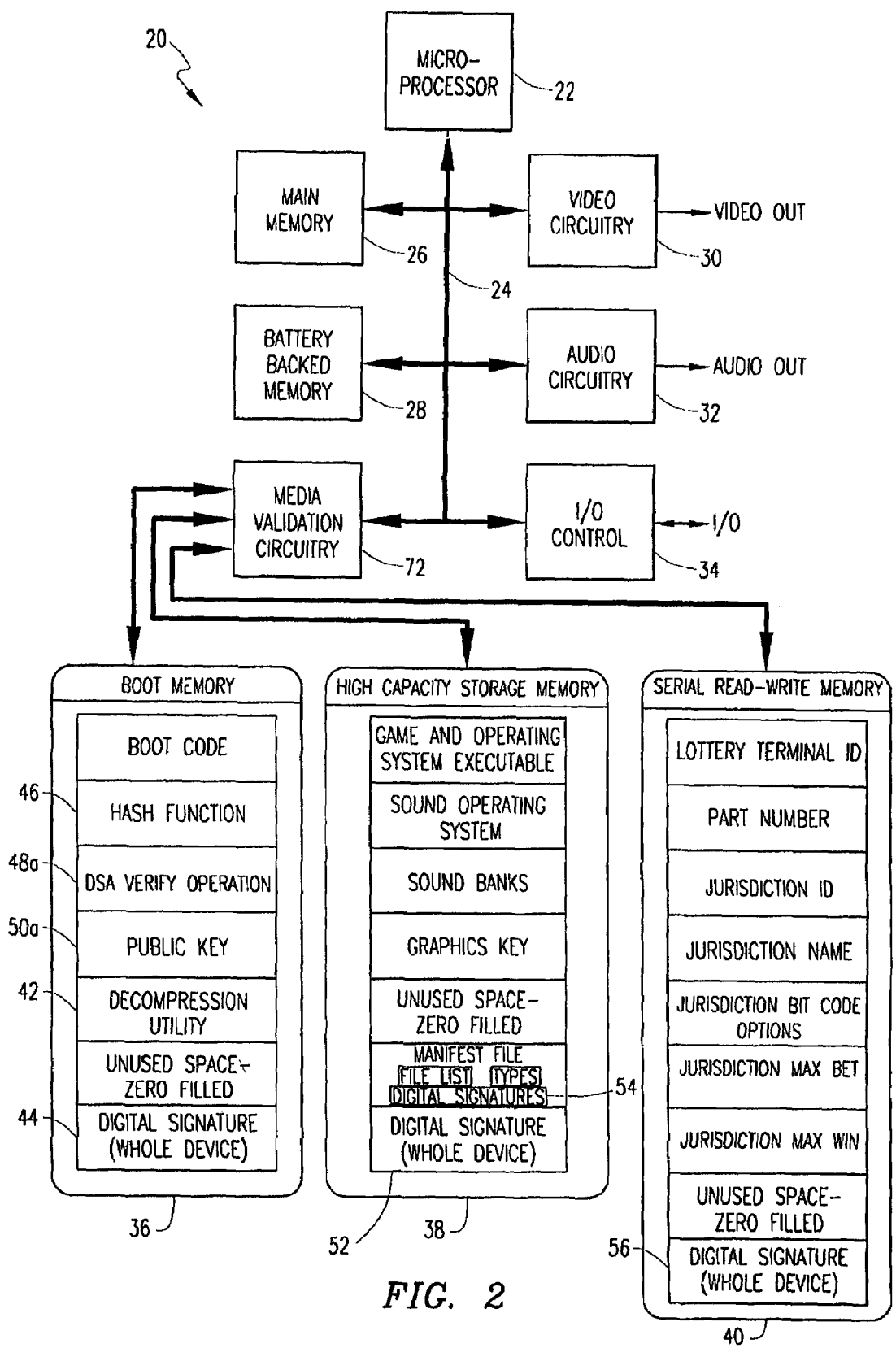
FIG. 2 is a block diagram of a CPU in a gaming machine including validation circuitry according to the present invention.

Referring now to FIG. 2, a central processing unit (CPU) 20 controls operation of the gaming machine 10. In response to receiving a wager and a command to initiate play, the CPU 20 randomly selects a game outcome from a plurality of possible outcomes and causes the display 12 to depict indicia representative of the selected game outcome. In an alternative embodiment, the central processor 20 controls display of a randomly selected outcome, the outcome in this case is selected by a remote server connected to the gaming machine. In the case of slots, for example, mechanical or simulated slot reels are rotated and stopped to place symbols on the reels in visual association with one or more pay lines. If the selected outcome is one of the winning outcomes defined by a pay table, the CPU 20 awards the player with a number of credits associated with the winning outcome.

The CPU 20 includes a microprocessor 22 and computer-readable storage. The microprocessor 22 interfaces with all other components of the gaming machine 10 via an interface bus 24. A main memory 26 stores gaming machine software program variables or files for operating the machine 10. The battery backed memory 28 stores machine critical data that cannot be lost when power is removed from machine 10. The video circuitry 30 supplies display information to a video display 12 which may comprise a CRT or other display device. Audio circuitry 32 generates sounds for game play on the gaming machine 10. The I/O control interfaces 34 controls input/output interfaces with the user such as game buttons, coin validators, bill validators, etc.

In a preferred embodiment, the computer-readable storage includes a boot memory 36, a high capacity storage memory 38, and a serial read-write memory 40. The boot memory 36 is preferably a read-only memory such as a one megabit EPROM. The high capacity storage memory 38 is preferably a compact flash card, hard disc drives, CD drives, etc. The serial memory 40 is preferably an EEPROM such as a 512 byte SPI EEPROM. Depending upon the preferences of the local regulatory agency, all three memories may be authenticated both outside of the CPU and then when installed in the CPU at power up.

The boot memory 36 stores boot code, an authentication program, a RAM loader, a decompression utility 42, and a digital signature 44. The authentication program includes a hash function 46, a digital signature algorithm (DSA) verify operation 48a, and a public key 50a. The hash function 46 may, for example, be an SHA-1 hash algorithm that reduces a data set to a unique 160 bit message digest. The digital signature 44 is generated from the boot memory's contents as a whole.

The high capacity storage memory 38 stores game and operating system executable program files, sound operating system files, sound bank files, graphics files, a manifest file, and a digital signature 52. The above files, taken together, constitute a "game data set" as that term is used herein, and the various files constitute "data files" as that term is used herein. Thus, the game data set includes a plurality of data files. The information (e.g., executable code, data, resources, etc.) in the above files constitutes "software" as that term is used herein. For each data file on the high capacity storage memory 38, the manifest file contains a file name, a file type, a load address, and a digital signature 54. The digital signature 52 is generated from the game data set as a whole, while each digital signature 54 is generated from the associated data file listed in the manifest file.

The serial memory 40 stores information specific to the jurisdiction where the CPU is to be installed. This information may, for example, include a lottery terminal identification (ID), a part number, a jurisdiction ID, a jurisdiction name, jurisdiction bit code options, jurisdiction max bet, jurisdiction max win, and a digital signature 56. The digital signature 56 is generated from the serial memory's contents as a whole.

Figure 3:
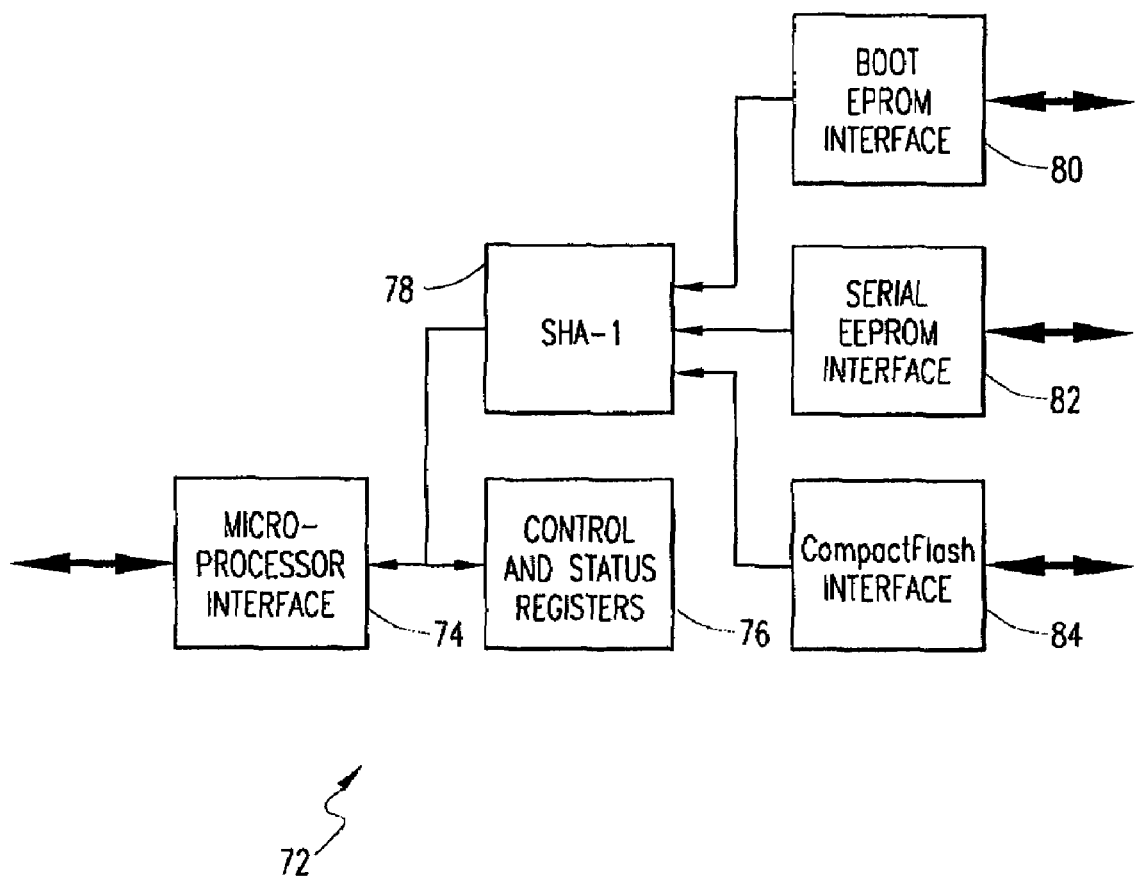
FIG. 3 is a block diagram of the validation circuitry.

The boot memory 36, serial read-write memory 40 and high capacity storage memory 38 are removable devices and/or contain alterable software that may be reprogrammed or download updated from an outside source via a network such as the Internet and must be authenticated by the gaming machine 10 at various points in time. The present invention proposes adding media validation circuitry 72 as illustrated in FIG. 3 between the microprocessor 22 and the interfaces with the boot memory 36, serial read-write memory 40 and high capacity storage memory 38. The media validation circuitry 72 performs part or all of the software authentication process rather than the process being performed by the microprocessor 22. In a preferred embodiment, the authentication process consists of the generation of the hash value of the data stored within the various memories and performance of a DSA on the generated hash values. Alternatively, encryption/decryption of generated values/signature may also be performed. In the preferred embodiment, the media validation circuitry performs the hash and DSA algorithms. Encryption and decryption algorithms, if performed, are still performed by software processed by the central processing unit 20. However, in alternative embodiments, the hash value generation, DSA algorithms and encryption/decryption algorithms may all be implemented within the media validation circuitry 72. Alternatively, execution of the hash value algorithm may be performed within the media validation circuitry 72 and the DSA would be performed by the CPU 20. Any combination of execution of software authentication processes may be performed between the CPU 20 and media validation circuitry 72. The media validation circuitry 72 in a preferred embodiment may be implemented as a field programmable logic assembly (FPLA) or an application specific integrated circuit (ASIC). The media validation circuitry 72, while shown in FIG. 2 as being interconnected between the interface bus 24 and the boot memory 36, serial read-write memory 40 and high capacity storage memory 38 could alternatively interface with these boot memory 36, serial read-write memory 40 and high capacity storage memory 28 by inter-connecting with the interface bus 24 via some type of plug-in cable connection and cable connector. Thus, the media validation circuitry 72 rather than being on the circuitry board of the gaming machine 10 would be removably connected to the gaming machine 10 via the cable.

By utilizing the media validation circuitry 72 to perform software authentication processes within the gaming machine 10, several benefits are provided. The media validation circuitry 72 is able to perform some or all of the software validation for the boot memory 36, serial read-write memory 40 and high capacity storage memory 38 at a speed greater than that provided by the microprocessor 22. The greater speed is provided from the fact that the media validation circuitry 72 provides specialized logic (78 in FIG. 3) for implementing the chosen validation algorithms in fewer clock cycles than the microprocessor and at a higher clock rate. The interfaces of the media validation circuitry 72 may be tuned to provide the highest possible data transfer speed between the validation circuitry 72 and the boot memory 36, serial read-write memory 40 and high capacity storage memory 38. Finally, the media validation circuitry 72 can provide the selected validation algorithms to each of the boot memory 36, serial read-write memory 40 and high capacity storage memory 38 at the same time or individually. Use of the media validation circuitry 72 off-loads a number of processing functions from the microprocessor 22 providing additional processing capabilities to be directed to additional game play for the gaming machine 10 or enabling the use of a less powerful microprocessor 22. Use of dedicated media validation circuitry 72 also reduces the amount of code necessary to perform software validation. This requires less space on the boot memory 36 enabling a smaller boot EPROM to be used.

By utilizing the media validation circuitry 72 it is possible to hide the boot memory 36, serial read-write memory 40 and high capacity storage memory 38 from the microprocessor 22 until these media have been validated. The validation circuitry 72 performs a complete validation process before allowing the microprocessor 52 to have access rights to the media. In the case of the boot EPROM (boot memory 36), the microprocessor 22 could be held in reset until the boot EPROM is validated or reset the microprocessor if an invalid boot EPROM is detected.

FIG. 3 is a block diagram showing one embodiment of the validation circuitry 72 that performs an SHA-1 algorithm on data from a boot EPROM 66 (boot memory 36), a serial EEPROM (serial read-write memory 40) and CompactFlash (high capacity storage memory 38). While this embodiment is illustrated with respect to the use of the SHA-1 algorithm, it should, of course, be realized that other known authentication algorithms may be utilized such as SHA-1, MD5, DES, 3DES, AES, etc. A microprocessor interface 74 allows the microprocessor 22 to communicate with devices directly through the interfaces provided by the validation circuitry 72. Internal control and status register 76 provide for control of the interface and the SHA-1 circuitry 78. Control provided by the control and status registers 76 includes individual start conditions for performing the authentication algorithm over each interface, the memory size of the device attached to each interface, and any areas in the interface device that should be masked from the authentication algorithm or being performed on it. The SHA-1 authentication algorithm circuitry 78 controls performance of the authentication and validation process for software contained within the boot memory 36, serial read-write memory 40 and high capacity storage memory 38. Each of these devices are interfaced with the validation circuitry through their own respective interface 80, 82, 84.

The previous description is of a preferred embodiment for implementing the invention, and the scope of the invention should not necessarily be limited by this description. The scope of the present invention is instead defined by the following claims.

What is claimed is:

1. A gaming machine for conducting a wagering game, comprising:
   at least one storage media for storing software associated with the wagering game;
   a processor for executing the software and accessing the software; and
   validation circuitry coupled between the processor and the at least one storage media, the validation circuitry including specialized authentication circuitry for performing at least a portion of authentication of the software in response to the processor requesting access to the software, the validation circuitry preventing the access to the software by the processor until the at least a portion of authentication of the software is complete, the specialized authentication circuitry performing the at least a portion of the authentication in fewer clock cycles than if the processor performed the at least a portion of the authentication.

2. The gaming machine of claim 1, wherein the validation circuitry is removably connected to the gaming machine via a cable.

3. The gaming machine of claim 1, wherein the specialized authentication circuitry performs the at least a portion of the authentication of the software using a SHA-1 algorithm.

4. The gaming machine of claim 1, wherein the specialized authentication circuitry performs the at least a portion of the authentication of the software using an MD5 algorithm.

5. The gaming machine of claim 1, wherein the specialized authentication circuitry performs the at least a portion of the authentication of the software using a DES algorithm.

6. The gaming machine of claim 1, wherein the specialized authentication circuitry performs the at least a portion of the authentication of the software using a 3DES algorithm.

7. The gaming machine of claim 1, wherein the specialized authentication circuitry performs the at least a portion of the authentication of the software using an AES algorithm.

8. The gaming machine of claim 1, wherein the validation circuitry is implemented in a field programmable logic assembly.

9. The gaming machine of claim 1, wherein the validation circuitry is implemented in an application specific integrated circuit.

10. The gaming machine of claim 1, wherein the at least one storage media comprises at least one of a boot EPROM, a serial EEPROM, a CompactFlash, a hard disk drive and a CD drive.

11. The gaming machine of claim 1, wherein the validation circuitry further comprises:
    a processor interface for interfacing the validation circuitry to the processor;
    wherein the specialized authentication circuitry is coupled to the processor interface, for performing a selected software validation algorithm;
    at least one storage media interface for interfacing the at least one storage media to the validation circuitry;
    control and status registers for controlling the interfaces and the specialized authentication circuitry; and a second storage media interface for interfacing a second storage media to the specialized authentication circuitry, wherein the selected software validation algorithm is performed individually for the at least one storage media and the second storage media.

12. The gaming machine of claim 1, wherein the validation circuitry performs a hash function.

13. The gaming machine of claim 12, wherein the validation circuitry performs a digital signature algorithm.

14. The gaming machine of claim 1, wherein the validation circuitry performs encryption and decryption functions.

15. A gaming machine for conducting a wagering game, comprising:
   a boot memory, a serial read-write memory, and a high capacity storage memory for storing software associated with the wagering game;
   a processor for executing the software; and
   validation circuitry coupled between the processor and the boot memory, the serial read-write memory, and the high capacity storage memory, the validation circuitry for performing at least a portion of authentication of the software, the validation circuitry including:
   a processor interface for interfacing the validation circuitry to the processor;
      validation algorithm circuitry coupled to the processor interface for performing a one or more selected software validation algorithms;
      at least one storage media interface for interfacing each of the boot memory, the serial read-write memory, and the high capacity storage memory to the validation algorithm circuitry; and
      control and status registers for controlling the interfaces and the validation algorithm circuitry, wherein the validation circuitry simultaneously performs the one or more selected software validation algorithms on more than one of the boot memory, the serial read-write memory, and the high capacity storage memory.

16. The gaming machine of claim 15, wherein the validation circuitry is removably connected to the gaming machine via a cable.

17. The gaming machine of claim 15, wherein the validation algorithm circuitry performs at least a portion of the authentication of the software using a SHA-1 algorithm.

18. The gaming machine of claim 15, wherein the validation algorithm circuitry performs at least a portion of the authentication of the software using an MD5 algorithm.

19. The gaming machine of claim 15, wherein the validation algorithm circuitry performs at least a portion of the authentication of the software using a DES algorithm.

20. The gaming machine of claim 15, wherein the validation algorithm circuitry performs at least a portion of the authentication of the software using a 3DES algorithm.

21. The gaming machine of claim 15, wherein the validation algorithm circuitry performs at least a portion of the authentication of the software using an AES algorithm.

22. The gaming machine of claim 15, wherein the validation circuitry is implemented in a field programmable logic assembly.

23. The gaming machine of claim 15, wherein the validation circuitry is implemented in an application specific integrated circuit.

24. The gaming machine of claim 15, wherein the validation circuitry performs a hash function.

25. The gaming machine of claim 24, wherein the validation circuitry performs a digital signature algorithm.

26. The gaming machine of claim 15, wherein the validation circuitry performs encryption and decryption functions.

27. A method for accelerating software authentication in a gaming machine for conducting a wagering game, the method comprising:
   storing software associated with the wagering game on at least one storage media in the gaming machine;
   receiving a request to access the software from a processor in the gaming machine; and
   performing at least a portion of authentication of the software via validation circuitry coupled between the processor and the at least one storage media without allowing the processor to access the software until the performing at least a portion of authentication of the software is complete, the validation circuitry including specialized authentication circuitry to perform the at least a portion of authentication of the software in response to the processor requesting access to the software, and the specialized authentication circuitry performing the at least a portion of the authentication in fewer clock cycles than if the processor performed the at least a portion of the authentication.

28. The method of claim 27, wherein the step of performing further includes the step of performing a hash function.

29. The method of claim 28 wherein the step of performing further includes the step of performing a digital signature algorithm.

30. A gaming machine for conducting a wagering game, comprising:
   means for storing software associated with the wagering game;
   means for executing the software; and
   means for performing at least a portion of authentication of the software without using the executing means coupled between the means for executing the software and the means for storing software, the means for performing at least a portion of authentication of the software including specialized authentication circuitry for performing at least a portion of authentication of the software in response to the means for executing the software requesting access to the software, the specialized authentication circuitry performing the at least a portion of the authentication in fewer clock cycles than if a general processor performed the at least a portion of the authentication and completing the performing before allowing access to the software by the means for executing.

31. A gaming machine for conducting a wagering game, comprising:
   at least two memories selected from a group comprising a boot memory, a serial read-write memory, and a high capacity storage memory, the at least two memories for storing software that controls a function of the gaming machine;
   a processor for accessing and executing the software; and
   validation circuitry coupled between the processor and the at least two memories for at least partially authenticating the software, and being distinct from the processor, the validation circuitry also preventing access to the software by the processor until the at least a portion of authentication of the software is complete; and
   wherein the validation circuitry simultaneously authenticates the software on the at least two memories.

32. The gaming machine of claim 31, wherein the validation circuitry performs at least one of a SHA-1 algorithm, MD5 algorithm, DES algorithm, 3DES algorithm, AES algorithm, and DSA algorithm.

33. The gaming machine of claim 31, wherein the validation circuitry is implemented in a field programmable logic assembly or an application specific integrated circuit.

34. The gaming machine of claim 31, wherein the validation circuitry partially authenticates the software and the processor partially authenticates the software.

35. An article of manufacture comprising:
   media storing a program to direct a processor to conduct a wagering game; and
   validation circuitry for at least partially authenticating the program, the validation circuitry being distinct from the processor and including specialized authentication circuitry for performing at least a portion of authentication of the program in response to the processor requesting access to the program, the specialized authentication circuitry performing the at least a portion of the authentication in fewer clock cycles than if the processor performed the at least a portion of the authentication, the validation circuitry preventing access to the program by the processor until the at least a portion of authentication of the software is complete.

* * * * *